(12) United States Patent
Pesquet-Popescu et al.

(10) Patent No.: US 11,823,040 B2
(45) Date of Patent: Nov. 21, 2023

(54) METHOD FOR TESTING AIR TRAFFIC MANAGEMENT ELECTRONIC SYSTEM, ASSOCIATED ELECTRONIC DEVICE AND PLATFORM

(71) Applicant: THALES, Courbevoie (FR)

(72) Inventors: Béatrice Pesquet-Popescu, Bailly-Romainvilliers (FR); Fateh Kaakai, Palaiseau (FR); Frédéric Barbaresco, Montgeron (FR)

(73) Assignee: THALES, Courbevoie (FR)

( * ) Notice: Subject to any disclaimer, the term of this patent is extended or adjusted under 35 U.S.C. 154(b) by 962 days.

(21) Appl. No.: 16/447,612

(22) Filed: Jun. 20, 2019

(65) Prior Publication Data

US 2019/0391909 A1  Dec. 26, 2019

(30) Foreign Application Priority Data

Jun. 21, 2018  (FR) ..................................... 18 00642

(51) Int. Cl.
| | |
|---|---|
| G06F 11/00 | (2006.01) |
| G06N 3/08 | (2023.01) |
| G06F 11/36 | (2006.01) |
| G06N 3/04 | (2023.01) |
| G08G 5/00 | (2006.01) |

(52) U.S. Cl.
CPC ............ *G06N 3/08* (2013.01); *G06F 11/3688* (2013.01); *G06N 3/04* (2013.01); *G08G 5/00* (2013.01)

(58) Field of Classification Search
CPC ........ G06N 3/08; G06N 3/04; G06F 11/3688; G08G 5/00

USPC .......................................................... 706/16
See application file for complete search history.

(56) References Cited

U.S. PATENT DOCUMENTS

| | | | | |
|---|---|---|---|---|
| 10,684,350 | B2 * | 6/2020 | Dupray | ................. H04W 4/021 |
| 2016/0314692 | A1 * | 10/2016 | Bahrami | .............. G08G 5/0017 |
| 2019/0138947 | A1 | 5/2019 | Cao et al. | |

FOREIGN PATENT DOCUMENTS

| | | |
|---|---|---|
| CN | 105225007 A | 1/2016 |
| CN | 105894862 A | 8/2016 |
| CN | 107944472 A | 4/2018 |

OTHER PUBLICATIONS

Anvardh Nanduri et al., "Generating Flight Operations Quality Assurance (FOQA) Data From The X-Plane Simulation", 2016 Integrated Communications Navigation and Surveillance (ICNS), 2016, (9 Pages Total).

(Continued)

*Primary Examiner* — Tyler J Lee
*Assistant Examiner* — Tiffany P Ohman
(74) *Attorney, Agent, or Firm* — ArentFox Schiff LLP

(57) ABSTRACT

The invention relates to a method for testing an air traffic management electronic system. The method includes receiving by the system of input data representative of a state of air traffic and establishing by the system of information related to air traffic as a function of the input data and delivery of the information to an electronic test device of the system. The method further includes determining by the electronic test device, as a function of the delivered information, of air traffic control instructions and providing said system with the instructions and receiving and processing of the instructions by the system.

8 Claims, 2 Drawing Sheets

(56) References Cited

OTHER PUBLICATIONS

French Search Report, from the French Patent Office in counterpart French Application No. 1800642, dated Apr. 12, 2019.

John M. Fabry et al., "Applications of Simulation and Artificial Intelligence Technology for ATC Training", 8078 Proceedings of the IEEE, vol. 77, No. 11, Nov. 1989, (4 Pages Total).

R. Thaens et al., "Mission-based radar optimisation via Automated Scenario Recognition", The 19th International Radar Symposium (IRS), German Institute of Navigation—DGON, 2018, (10 Pages Total).

Baomar, Haitham, et al., "Autonomus Navigation and Landing of Large Jets Using Artificial Neural Networks and Learning by Imitation", 2017 IEEE Symposium on Computational Intelligence (SCCI), IEEE, Nov. 27, 2017, pp. 1-10 (2017).

Crespo, A.M.F., et al., "ATFM Computational Agent Based on Reinforcement Learning Aggregating Human Expert Experience", 2011 IEEE Forum on Integrated and Sustainable Transportation Systems, IEEE, Jun. 29-Jul. 1, 2011, pp. 323-328 (2011).

\* cited by examiner

METHOD FOR TESTING AIR TRAFFIC MANAGEMENT ELECTRONIC SYSTEM, ASSOCIATED ELECTRONIC DEVICE AND PLATFORM

CROSS-REFERENCE TO RELATED APPLICATIONS

This application claims priority to French Patent Application No. 18 00642, filed on Jun. 21, 2018. The disclosure of the priority application is incorporated in its entirety herein by reference.

TECHNICAL FIELD

The present invention relates to the field of electronic air traffic control systems, typically electronic air traffic management (ATM) systems. Such a system provides the interfacing between an air traffic controller on the one hand, for example responsible for a given geographical sector, and on the other hand the aircraft located within the geographical sector or other air traffic controllers, in particular those responsible for the neighboring geographical sectors.

BACKGROUND

Such a system receives data from outside systems (weather data, aircraft flight plans, radar detection, messages from air traffic controllers from neighboring sectors, etc.), processes this data, optionally combines it, etc., then retrieves, via an MMI (man-machine interface), this data or the information resulting from the processing operations for the air traffic controller. The air traffic controller, based on this data and information, determines air traffic control instructions (commands intended for the aircraft, messages for the neighboring controllers including information, data, etc.) and enters it via the MMI. The system next processes these commands.

Such a system is regularly subjected to validation and integration tests. In a known manner, such validation and integration tests seek to verify the proper operation of the system, and to detect any bugs, first at the builder of the system, then once the system is installed on the operating site. They for example made it possible to verify the compliance of the system's behavior with the specifications, both internal and in terms of its exchanges with the outside interfaces, to test its performance, for example the response time, and its robustness. These validation and integration tests take place with input data that may or may not be predefined. These tests must be carried out during the introduction of new functionalities into the electronic control system of the air traffic controller or to test the non-regression of the existing functionalities. They require the participation, for days or even weeks, of air traffic controllers to interact with the system, in the same way as during traditional operational use, which is a brake to the implementation of complete and intensive tests, and in so doing to the rapid deployment of technical upgrades to these systems.

As an example, a known functionality of an air traffic control system is the detection of conflicts, where an alert is generated if the system detects a collision risk between two aircraft in the next n minutes (for example, n=3). In such a case, while thus being notified by the alert and in light of the other data provided by the system regarding the current state of air traffic and the air traffic environment, the controller gives commands to said aircraft and if applicable communicates with the controllers of the neighboring sectors via their respective ATM system.

When the conflict detection method changes, for example by using a new conflict detection algorithm, tests are carried out, including supplying the ATM system with input data that are next processed and/or displayed, analyzing them via the air traffic controller, providing instructions via the latter, then processing these instructions via the ATM system, the behavior of the system being supervised in order to detect inconsistencies, drifts, regressions, etc.

Another functionality of an ATM system is for example the supervision of the safety distances between aircraft. When the retrieval form of this functionality changes, tests must also be carried out.

There is therefore a need to facilitate the implementation of tests for air traffic control electronic control systems.

SUMMARY

To that end, according to a first aspect, the invention proposes a test method for an air traffic control electronic control system delivering information relative to air traffic control established as a function of input data representative of the state of the air traffic control received by said system, said system further receiving, and processing, in the operational phase, control instructions from air traffic control that are provided to it by at least one air traffic controller, said method being characterized in that it includes, during a test phase of said system, the following steps:
  reception by said system of input data representative of the state of air traffic;
  establishment by said system of information relative to the air traffic as a function of said input data and delivery by said system of said information to an electronic test device of the system;
  determination by said electronic test device of the system, as a function of the delivered information, of air traffic control instructions and providing said system with said instructions;
  reception and processing of said instructions by said system;
according to which said electronic device includes an algorithmic model for automatically determining instructions as a function of information relative to the air traffic, said model having been obtained during a learning phase, carried out by computer, of a deep learning neural network, as a function of a set of instructions previously provided by at least one air traffic controller to the system and information relative to the air traffic associated with said instructions.

The invention thus makes it possible to perform electronic control tests of the air traffic of much greater duration and intensity, which makes it possible to accelerate and reliabilize the operational commissioning of new functionalities or more generally of new versions of these systems.

In embodiments, the test method according to the invention further includes one or more of the following features:
  the test method includes, during the test phase, the detection of one or more nonconformities of the system as a function of the behavior of the system;
  the algorithmic model for automatically determining instructions has been learned in order to determine instructions specific to at least one element, as a function of a determination by element from among several elements of the same type, during the learning of the instructions previously provided by at least one air traffic controller to the system and of the information relative to the air traffic control associated with said instructions, said element from among several elements of the same type being a geographical sector from among several geographical sectors and/or an air traffic controller role from among several roles and/or a functionality of the electronic control system of the air traffic from among several functionalities of said system;

the test method comprises the steps of:
determining an algorithmic constraint module adapted for identifying instructions not compliant with the rules of the air traffic controllers;
applying said algorithmic module to the set of instructions previously supplied by at least one air traffic controller to the system and removing said instructions identified as not compliant from the set used for the learning of the neural network;
applying said algorithmic module to the instructions determined by the electronic test device and not considered in the phase for testing instruction(s) identified as not compliant.

the test method comprises, in a phase preliminary to the test, the steps of:
collecting and storing a set of instructions previously provided to the system by at least one air traffic controller and information relative to the air traffic controller delivered by the system associated with said instructions;
determining the algorithmic model for automatically determining instructions as a function of information relative to the air traffic controller by learning, carried out by computer, of a neural network, as a function of said stored set of instructions and said stored information relative to the air traffic and associated with said instructions.

According to a second aspect, the present invention proposes an electronic test device for an air traffic control electronic control system delivering information relative to air traffic control established as a function of input data representative of the state of the air traffic control received by said system, said system further receiving, and processing control instructions from air traffic control that are provided to it by at least one air traffic controller, said electronic test device being characterized in that it is adapted for receiving information relative to the air traffic delivered by the system and in that it includes an algorithmic model for automatically determining instructions as a function of information relative to the air traffic, said model having been obtained during a learning phase, carried out by computer, of a deep learning neural network, as a function of a set of instructions previously provided by at least one air traffic controller to the system and information relative to the air traffic associated with said instructions.

In embodiments, the test device according to the invention further includes one or more of the following features:
it is adapted for detecting the nonconformity of the system as a function of the behavior of the system;
the algorithmic model for automatically determining instructions has been learned in order to determine instructions specific to at least one element, as a function of a determination by element from among several elements of the same type, during the learning of the instructions previously provided by at least one air traffic controller to the system and of the information relative to the air traffic control associated with said instructions, said element from among several elements of the same type being a geographical sector from among several geographical sectors and/or an air traffic controller role from among several roles and/or a functionality of the electronic control system of the air traffic from among several functionalities of said system.

According to a third aspect, the present invention proposes a test platform for an air traffic control electronic control system delivering information relative to air traffic control established as a function of input data representative of the state of the air traffic control received by said system, said system further receiving, and processing, in the operational phase, control instructions from air traffic control that are provided to it by at least one air traffic controller, said platform being adapted for collecting and storing a set of instructions previously provided to the system by at least one air traffic controller and information relative to the air traffic controller delivered by the system associated with said instructions;

determining the algorithmic model for automatically determining instructions as a function of information relative to the air traffic controller by learning, carried out by computer, of a neural network, as a function of said stored set of instructions and said stored information relative to the air traffic and associated with said instructions;

obtaining an electronic test device of the system including said algorithmic model for automatically determining instructions;

testing said system via said electronic test device.

According to a fourth aspect, the present invention proposes a test platform including:
an air traffic control electronic control system delivering information relative to air traffic control established as a function of input data representative of the state of the air traffic control received by said system, said system further receiving, and processing control instructions from air traffic control that are provided to it by at least one air traffic controller; and
an electronic test device of said electronic system according to one of the claims according to the second aspect of the invention.

SUMMARY

These features and advantages of the invention will appear upon reading the following description, provided solely as an example, and done in reference to the appended drawings, in which.

DETAILED DESCRIPTION

Figure 1:
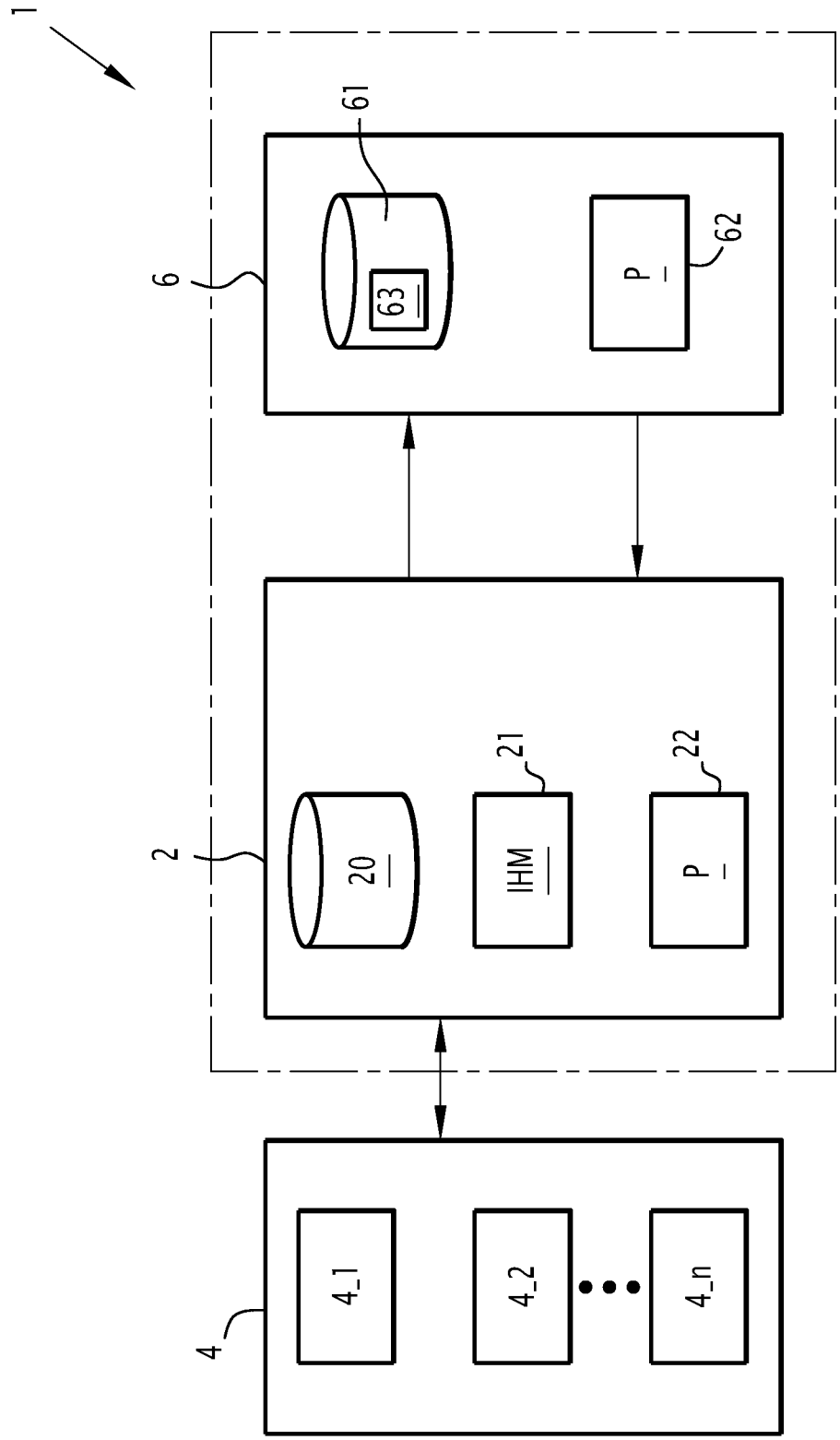
FIG. 1 shows a view of a test platform in one embodiment of the invention.

FIG. 1 shows a test platform 1 of an air traffic control electronic control system. In the considered example, the test platform 1 includes an air traffic control electronic control system 2, called ATM system 2 hereinafter, and an electronic test device 6.

The ATM system 2 includes a memory 20, an MMI unit 21 and a processor 22.

The MMI unit 21 for example includes display screens, for instance touch-sensitive, a speaker system, a keyboard, a microphone, etc.

Furthermore, the ATM system 2 is connected by telecommunication links to a set 4 of outside systems 4_1, 4_2, . . . , 4_n.

These outside systems for example include aircraft, radars, weather stations, telecommunication devices of other air traffic controllers, airport control rooms, etc.

The ATM system 2 is adapted for receiving, and storing in its memory 20, input data (and the timestamp of such data).

This input data includes external data, i.e., which is delivered to it by the outside systems 4_1, 4_2, . . . , 4_n of the set 4 representing the current or future state of the airspace (or a given sector of the airspace) for example and non-exhaustively including:
- for each aircraft currently or imminently in the sector: coordinates in 3 dimensions (3D), aircraft type, its heading, its speed, its flight plan;
- current and future weather information;
- air traffic density indicators (such as the number of airplanes in the sector, turbulence), data defining the current and future structure of the airspace (such as the presence of military no-fly zones, air corridors, current and future configuration of the airport (open runways, wind direction, available taxiways, etc., surveillance data (as derived from primary and secondary radars, ADS-B, WAM, etc. data);
- coordination messages with air traffic controllers operating on ATM systems relative to adjacent sectors.

The ATM system 2 is further adapted for retrieving this data for the air traffic controller, via the MMI unit 21.

The external data can further be processed (for example averaged, verified, combined, analyzed, etc.) before retrieval.

The input data generally includes this processed data and its timestamp.

The ATM system 2 is further adapted for generating data internal to the ATM system 2, representative of its current state. It is in particular generated using probes or functions installed in the ATM system 2 and for example, non-exhaustively, includes:
a queue of messages, shared data, logs, technical layouts, a focus action on a flight tag, zoom in or zoom out factor on a given zone, voice conversation transcription between a controller and an aircraft pilot, etc. The internal data is accessible to the air traffic controller operating the ATM system 2 via the MMI 21. In one embodiment, the input data stored in the memory 20 also includes this internal data, with the timestamp corresponding to said data.

In one embodiment, the ATM system 2 is adapted for implementing upgraded functions using the externals and generating internal data. These functions are carried out for example using computer programs implementing the function, which are stored in the memory 20 and executed on the processor 22. These functions for example include detecting conflicts, identifying a collision risk between an aircraft and another aircraft, or a risk of an aircraft entering a zone during a grounding period in the zone, etc., or determining a solution making it possible to resolve the conflict. The results of these functions are retrieved via the MMI 21, for the air traffic controller.

In a known manner, an air traffic controller operating the ATM system 2 can thus learn, via the MMI 21, at each moment, of the current or future air traffic situation, as a function of external data and/or as a function of internal data, including the results of the upgraded functions. These data and results are provided to him via the MMI 21. Based on these elements, the air traffic controller then makes decisions that he provides to the ATM system 2 via the MMI 21 (in text or visual or voice form, etc.).

These decisions include instructions intended for aircraft and/or ATM systems of controllers of adjacent sectors. They can thus include target flight altitude commands, target speed commands (horizontal, vertical), target heading commands, target claim or descent gradient commands, etc.

The electronic test device 6 includes a memory 61 and a processor 62. In the memory 61, an artificial neural network 63 is in particular stored.

Figure 2:
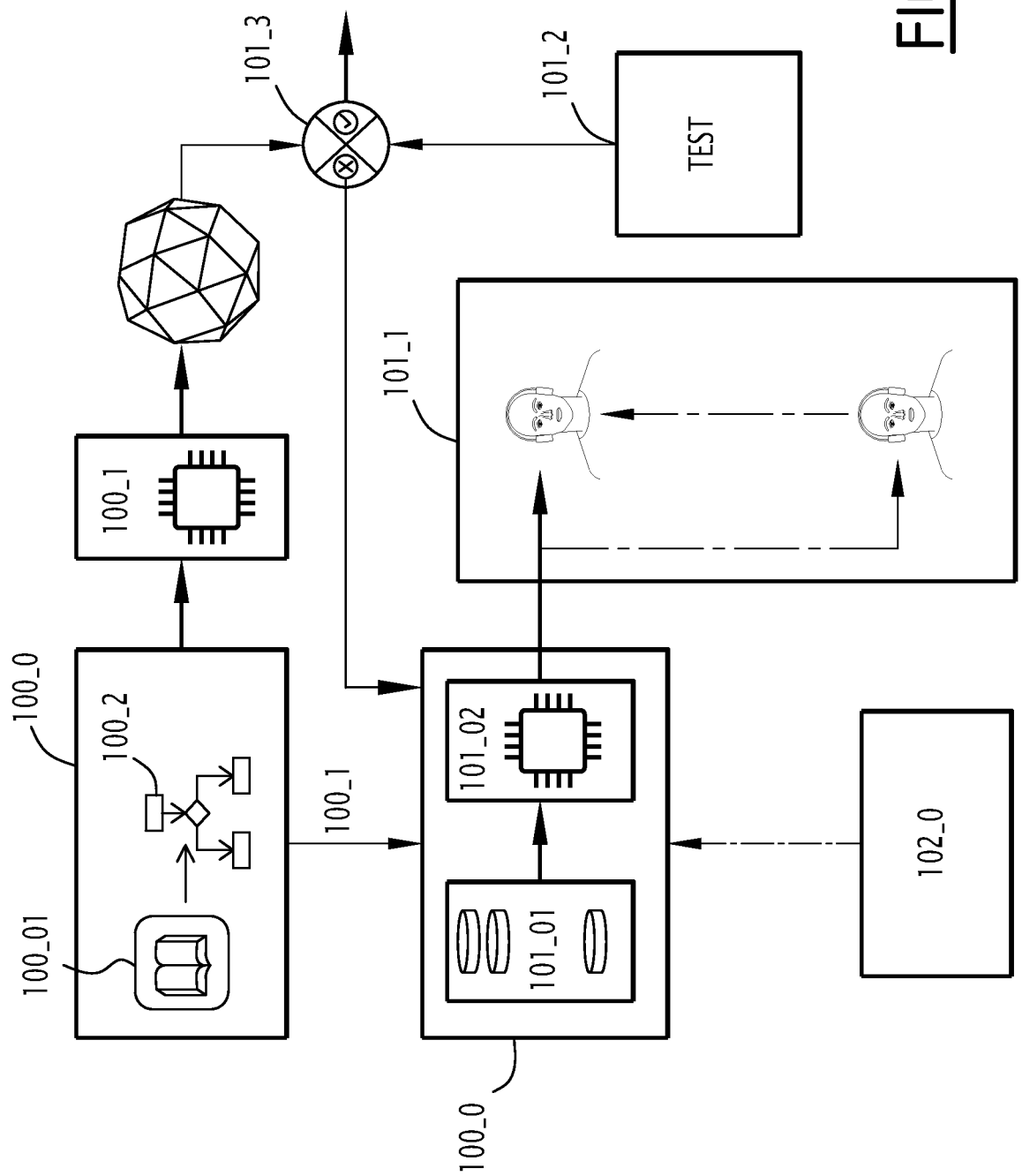
FIG. 2 is a flowchart of steps implemented in one embodiment of the invention.

FIG. 2 is a flowchart of steps implemented in one embodiment of the invention.

The neural network 63 is adapted, in a preliminary phase 101_0 for obtaining the programmed network, for performing learning of the behavior of the air traffic controller(s), from a history of input elements including external data of the ATM systems, and including, in embodiments, internal data of the ATM systems and/or results of functions, and from a history of output elements including the decisions made by the air traffic controllers in light of these respective input elements.

This history is for example made from the collection over several months, from the ATM system 2, or another ATM system similar to the ATM system 2 or from several operational ATM systems, of all of these elements and their storage. In one embodiment, said storage is done in the memory 20.

It will be noted that this preliminary phase 101_0 for learning of the neural network 63, according to the embodiments:
- is carried out, within the electronic test device 6, by using the memory 61 and the processor 62, or
- is carried out on a specific learning platform (not shown), equipped with its own memory and computing resources.

In one embodiment, for each test configuration, the preliminary phase 101_0 includes a preparation phase 101_01 for the input and output elements identifying which are (the extracts of) those of the input and output elements useful for the test, in the decision-making, as well as for example the minimum collection duration.

In a known manner, the preparation of these elements can include the segmentation of the collected elements, the detection of missing elements and operations, the reduction of the dimensions of the elements, the extraction of groups, the identification of causes and relationships, and to finish, the definition of a set of training elements including input training elements and associated output elements. For each test configuration, the preliminary phase 101_0 includes a training phase 101_02 strictly speaking for the neural network 63 from input and output training elements associated with the set of training elements. One neural network per test configuration is thus determined.

These principles of the definition of sets of training data, learning and use of neural networks are well known, cf. for example:

Tolk, A. (2015, July). The next generation of modeling & simulation: integrating big data and deep learning. In Proceedings of the Conference on Summer Computer Simulation (pp. 1-8). Society for Computer Simulation International;

Akerkar, R. (2014). Analytics on Big Aviation Data: Turning Data into Insights. IJCSA, 11(3), 116-127;

Boci, E., & Thistlethwaite, S. (2015, April). A novel big data architecture in support of ADS-B data analytic. In Integrated Communication, Navigation, and Surveillance Conference (ICNS), 2015 (pp. C1-1). IEEE;

Bengio, Y. (2009). Learning deep architectures for AI. Foundations and Trends® in Machine Learning, 2(1), 1-127.

The result of the training phase 101_02 is the delivery 101_1 of a trained neural network 63, also called (algorithmic) model air traffic controller. This model is next recorded in the electronic device 6, which is then able to be used in the test phase 101_2 in order to test the ATM system 2.

In embodiments, the input and output elements are structured by geographical air sector, the training of the neural network then also being differentiated by sector, and the behavior of the air traffic controller algorithmic model 63 obtained in step 101_1 being specific to each sector.

Similarly, in embodiments, the sets of training elements are structured by technical functionality of the ATM system (for example detection of conflicts or flight altitude commands or coordination between controllers) or by specific role of an air traffic controller (for example, command role or planning role and exchange with the adjacent sectors). In such a case, the obtained trained model is then specific to a role or a functionality. Mixed modes can further be generated, specific to at least two aspects among the sector, functionality and role aspects.

Any type of artificial neural networks can be used. For example, a deep learning network, a convolutional neural network (CNN) are used. The number of input nodes will be chosen to be equal to the number of input elements and the number of output nodes will be chosen to be equal to the number of output elements for each test configuration.

During a test phase 101_2 of the ATM system 2, the following steps are carried out and reiterated:
  reception by the ATM system 2 of external data representative of the current state of air traffic;
  establishment, by said ATM system 2, of information relative to the air traffic as a function of said data, including at least some of the external data, as well as updated internal data, for example results of functions of the ATM system 2, and delivery, by said system 2, via the MMI 21, of information to the electronic test device 6;
  determination, by the neural network 63 of the electronic test device 6, as a function of the delivered information, of output elements including air traffic control decisions; these decisions include instructions intended for aircraft and/or ATM systems of controllers of adjacent sectors;
  and provision by the test device 6 via the MMI 21 to said ATM system 2 of said output elements;
  reception and processing of said output elements by said system 2, including the transmission of the decisions to the aircraft and/or to the ATM systems of controllers of adjacent sectors.

The nonconformities of the system are detected during the test phase, by analysis of the behavior of the system 2. This detection is done for example by the test device 6 or any other means.

Several types of test targeting separate purposes can be implemented in the existing test phase 101_2.

One type of test is for example an extensive verification test campaign, based on actual input data (i.e., internal data, or even furthermore external data) of the ATM system 2, from which input data test sets of the controller model are randomly generated (some in the accepted ranges, others outside the accepted ranges to test the robustness). The decisions of the controller model 63 will be compliant with the behavior of the human controller as learned.

Another type of test phase is for example a non-regression test campaign: in such a case, one uses the test device 6 based on the controller model 63 generated before upgrade of the ATM system 2, the ATM system 2 taking account of the upgrade by providing the ATM system 2 with external input data equal to that having previously allowed this controller model to learn. If there is no injection into the ATM system 2 of a functional deviation of the specification (software bug, edge effect of a technical change such as hardware update, etc.), it is expected that the test device 6 will deliver exactly the same output decisions. Otherwise, there is potentially a regression in the ATM system 2 and additional investigations must be conducted.

Another type of test phase is for example an endurance test campaign: such a campaign is similar to a non-regression campaign except that the objective is different. The purpose of an endurance test campaign is to exploit the previous status of the non-regression tests to build a service experience, which will be:
  done in an early stage of the lifecycle of the ATM system 2, i.e., before the operational transition,
  done in an accelerated manner by duplicating many instances of the ATM system 2 to be validated and many instances of models of controllers and test input data sets.

An ATM system 2 evolving regularly, the updates, both functional (introduction of new functions or modified functions) and technical (changes of hardware, operating system, etc.), are to be taken into account in the tests. In such a situation, in one embodiment, the algorithmic model 63 corresponding to the ATM system 2 before update is completed to account for these updates. Thus in reference to FIG. 2, in a step 102_0, input elements including internal data of the ATM systems, external data of the ATM systems, and output elements including the decisions made by the air traffic controllers in light of these respective input elements, are recorded and stored during validation sessions done by air traffic controllers on a test platform representative of the operational platform relative to the part of the ATM system 2 that is updated. The step 101_0 for obtaining a programmed neural network is then carried out based on these input and output elements, and leads to the delivery of an air traffic network controller model targeted on the part of the ATM system 2 that is updated. In step 101_1, a combination of the algorithmic model corresponding to the ATM system 2 before update and the algorithmic model of the ATM system 2 targeted on the updated aspects is done (for example, in embodiments, by a concatenation), thus making it possible to deliver a complete algorithmic model corresponding to the updated ATM system 2. Furthermore, in one embodiment, in a securing step 100_0, rules, principles, constraints, conditions and prohibitions implemented by the air traffic controllers in the application of their trade (for example corresponding to the ICAO standards as defined in document 4444) are formalized in algorithmic form.

For example, these rules include that:
  a1/ an air traffic controller cannot provide commands regarding aircraft outside the sector for which it is responsible,
  a2/ except for certain exceptions specifically defined by the conditions Cond1, Cond2, Cond3;
  a3/ in a given situation corresponding to a given aircraft speed and altitude, a commanded change in flight level altitude must be below a given threshold depending on said speed and altitudes.

The resulting securing algorithm is, in one embodiment, implemented in a step 100_1 on the input and output training elements associated with the set of training elements prior to the building of an air traffic controller model, which makes it possible to detect the elements not conforming to the standardized practice, and next either to eliminate them from the set of training elements, or to assign them to a "bad practice" class allowing the model to better learn the behavior of the controller according to a "good practice".

In one embodiment, in a step 100_1, these rules, principles, constraints, conditions and prohibitions implemented by the air traffic controllers in the application of their trade are also provided as learning data to an artificial neural network and, at the end of the learning phase, a model encompassing these rules is delivered, hereinafter called securing model. In a step 101_3, each decision next made by the controller model 63 during the test phase 101_2 is provided to this securing model, which either validates the decision as conforming to good practices (in particular validates that it is in the acceptable dynamic range for the output decisions), or invalidates the decision, which is then not taken into account in the context of tests and for example then enriches the class of "bad practice", which results in reinforcing the air traffic controller model.

The present invention thus makes it possible to obtain an electronic test device 6 based on an air traffic controller model 63 learned by neural network.

In the test phases, the obtained air traffic controller model 63 can be duplicated and each copy can be installed in the same electronic device 6 or installed in respective test devices similar to the device 6; this makes it possible to increase the number and reach of the tests done in parallel on the ATM system 2, or even on instances, also duplicated (on the cloud, for example), of the ATM system 2. In embodiments of the test phase implemented using these devices, the input data can be distributed among the different models or devices, each model being assigned to a separate specific sector, or a separate time period (peak hours, off-peak hours, weekly or monthly periods, etc.).

In another embodiment, the neural network model 63 is made in the form of a programmable logic component, such as a GPU (Graphics Processing Unit) or multi-GPU.

The invention claimed is:

1. A test method for testing an air traffic control electronic control system ("control system") by an electronic test device distinct from the control system, the control system delivering, as a function of input data representative of a state of air traffic received by the control system, information related to air traffic established as a function of input data representative of a state of the air traffic, in an operational phase, the control system further receiving, and processing, air traffic control instructions, said air traffic control instructions being provided, by at least one air traffic controller, to the control system, the test method comprising a test phase comprising the following steps:
receiving, by the control system, input data representative of the state of air traffic;
establishing, by the control system, information related to the air traffic as a function of said input data and;
delivering, from the control system to the electronic test device, said information established by the control system;
determining, air traffic control instructions by the electronic test device, from the information established and delivered by the control system;
providing the air control traffic instruction by the electronic test device, from the electronic test device to the control system;
receiving and processing of said instructions by the control system;
detecting, by the electronic test device, of one or more non-conformities of the control system as a function of a behavior of the control system;
according to which said electronic test device includes an algorithmic model, the algorithmic model being configured to determine instructions as a function of information related to the air traffic,
the algorithmic model having been obtained during a learning phase, carried out by a computer, of a deep learning neural network, as a function of:
a set of instructions previously provided by at least one air traffic controller to the control system, and
information related to the air traffic associated with said instructions.

2. The test method for the air traffic control electronic control system according to claim 1, wherein the algorithmic model for automatically determining instructions has been learned in order to determine instructions specific to at least one element, as a function of a determination by element from among a plurality of elements of a same type, during the learning phase based on the set of instructions previously provided by at least one air traffic controller to the system and of the information related to the air traffic associated with said instructions, said element from among the plurality of elements of the same type being a geographical sector from among a plurality of geographical sectors and/or an air traffic controller role from among a plurality of roles and/or a functionality of the air traffic control electronic control system of the air traffic from among a plurality of functionalities of said system.

3. The test method for the air traffic control electronic control system according to claim 1, further comprising the steps of:
determining a securing model configured to validate instructions as good practices when the instruction is within an acceptable dynamic range or to validate instructions to be bad practices when the instruction is outside of the acceptable dynamic range; and
applying the securing model to the instructions previously supplied by at least one air traffic controller to identify instructions identified as good practices and instructions considered as bad practices,
wherein the instructions previously provided to the air traffic control electronic control system by the at least one air traffic controller to determine the instructions by the test electronic device are only the instructions previously provided that have been validated by the securing model.

4. The test method for the air traffic control electronic control system according to claim 1, further comprising, in the learning phase, preliminary to the test phase, the steps of:
collecting and storing a set of instructions previously provided to the system by at least one air traffic controller and information related to the air traffic delivered by the system associated with said set of instructions;
determining the algorithmic model for automatically determining instructions as a function of information related to the air traffic by learning, carried out by the computer of a neural network, as a function of said stored set of instructions and said stored information related to the air traffic and associated with said set of instructions.

5. An electronic test device of an air traffic control electronic control system "control system") delivering information related to air traffic established as a function of input data representative of the state of the air traffic received by the control system, said system further receiving, and processing air traffic control instructions that are provided to it by at least one air traffic controller, with the electronic test device being distinct from the control system;

wherein the electronic test device is adapted for:

determining air traffic control instructions from the information established and delivered by the control system;

providing the air traffic control instructions to the control system;

receiving and processing of said instructions by the control system;

detecting the nonconformity of the control system as a function of a behavior of the system and, wherein said electronic test device is adapted for receiving information related to the air traffic delivered by the system and in that it includes an algorithmic model for automatically determining instructions as a function of information related to the air traffic, said algorithmic model having been obtained during a learning phase, carried out by computer, of a deep learning neural network, as a function of a set of instructions previously provided by at least one air traffic controller to the control system and information related to the air traffic associated with said instructions.

6. The electronic test device according to claim 5, wherein the algorithmic model for automatically determining instructions were learned in order to determine instructions specific to at least one element, as a function of a determination by element from among a plurality of elements of a same type, during the learning phase based on the set of instructions previously provided by at least one air traffic controller to the system and of the information related to the air traffic associated with said instructions, said element from among the plurality of elements of the same type being a geographical sector from among a plurality of geographical sectors and/or an air traffic controller role from among a plurality of roles and/or a functionality of the electronic control system of the air traffic from among a plurality of functionalities of said system.

7. A test platform comprising:

an air traffic control electronic control system ("control system") delivering information related to air traffic established as a function of input data representative of the state of the air traffic received by the control system, the control system further receiving, and processing control instructions from air traffic control that are provided to it by at least one air traffic controller; and an electronic test device of said control system according to claim 5.

8. A test platform for an air traffic control electronic control system ("control system") delivering information related to air traffic established as a function of input data representative of the state of the air traffic received by control system, the control system further receiving, and processing, in the operational phase, air traffic control instructions that are provided to it by at least one air traffic controller, said platform being adapted for collecting and storing a set of instructions previously provided to the control system by at least one air traffic controller and information related to air traffic delivered by the control system associated with said set of instructions;

determining an algorithmic model for automatically determining instructions as a function of information related to the air traffic by learning, carried out by a computer, of a deep learning neural network, as a function of said stored set of instructions and said stored information related to the air traffic and associated with said set of instructions;

obtaining an electronic test device of the system including said algorithmic model for automatically determining instructions;

testing said system via said electronic test device; and detecting, by said electronic test device, of one or more conformities of the system as a function of a behavior of the system, with the electronic test device being distinct from air traffic control electronic control system.

\* \* \* \* \*